United States Patent
Cykana et al.

(10) Patent No.: US 7,535,605 B2
(45) Date of Patent: May 19, 2009

(54) OCR TARGETING DEVICE

(75) Inventors: Michael J. Cykana, Arlington, TX (US);
Ann M. Maslyk, Arlington, TX (US);
Eric C. Rathbun, Lewisville, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 1088 days.

(21) Appl. No.: 10/824,328

(22) Filed: Apr. 14, 2004

(65) Prior Publication Data

US 2005/0008265 A1 Jan. 13, 2005

Related U.S. Application Data

(60) Provisional application No. 60/462,622, filed on Apr. 14, 2003.

(51) Int. Cl.
H04N 1/04 (2006.01)
H04N 1/024 (2006.01)
H04N 1/46 (2006.01)

(52) U.S. Cl. .............. 358/488; 358/473; 358/478; 358/497; 358/507

(58) Field of Classification Search ............ 358/488, 358/473, 478, 497, 507, 509, 475, 510, 480, 358/474, 471, 483; 209/583, 584, 900; 382/313, 382/321, 101, 102; 40/475; 235/901; 248/311.2, 248/560, 127, 346.01, 364, 910; 269/55, 269/289 R, 315

See application file for complete search history.

(56) References Cited

U.S. PATENT DOCUMENTS

| | | | | |
|---|---|---|---|---|
| 4,574,318 A * | 3/1986 | Dayton et al. ........... 358/483 |
| 4,691,909 A * | 9/1987 | Owada et al. ........... 40/475 |
| 4,916,550 A * | 4/1990 | Miyake et al. .......... 358/471 |
| 5,010,420 A * | 4/1991 | Hasegawa et al. ....... 358/471 |
| 5,477,044 A | 12/1995 | Aragon ................. 235/472 |
| 5,539,193 A | 7/1996 | Gibbs et al. ........... 235/472 |
| 5,640,252 A * | 6/1997 | Turner et al. .......... 358/497 |
| 5,757,519 A * | 5/1998 | Yoo .................... 358/475 |
| 5,796,495 A * | 8/1998 | Miyata et al. .......... 358/471 |
| 5,978,103 A * | 11/1999 | Welsh ................... 358/475 |
| 6,097,507 A | 8/2000 | Bohn ................... 358/473 |
| 6,323,964 B1 * | 11/2001 | Yamamoto et al. ....... 358/474 |
| 6,410,931 B1 | 6/2002 | Dvorkis et al. ......... 250/566 |
| 6,459,505 B1 * | 10/2002 | Swartz et al. .......... 358/471 |
| 7,092,132 B2 * | 8/2006 | Matsuda ................ 358/474 |
| 7,268,924 B2 * | 9/2007 | Hussey et al. .......... 358/509 |
| 2005/0269473 A1 * | 12/2005 | Carnevali et al. ....... 248/311.2 |

OTHER PUBLICATIONS

IBM e-business and integrated logistics, "Intelligent Mobile Imager for Postal Applications," GISEE181, 03-03, 2 pages.

* cited by examiner

*Primary Examiner*—Houshang Safaipour

(57) ABSTRACT

A targeting device suitable for mounting an optical scanner includes a frame, a linkage slidably mounted on the frame, an actuator arm secured to the linkage, which actuator arm has an outer surface configured to slidingly engage the surface of the object to be scanned and a holder mounted on such that the actuator arm moves in tandem with the linkage along the frame when the object to be scanned is inserted between the actuator arm and a support surface below the actuator arm so that an optical scanner in the holder is held at a predetermined scanning distance from the object to be scanned.

17 Claims, 5 Drawing Sheets

OCR TARGETING DEVICE

RELATED APPLICATIONS

This application claims priority based on U.S. Provisional Application Ser. No. 60/462,622, filed Apr. 14, 2003.

TECHNICAL FIELD

The invention relates to optical scanning systems, particularly to devices for positioning an object to be scanned relative to an optical scanner.

BACKGROUND OF THE INVENTION

The use of hand held devices for optical character recognition (OCR) has many applications in industry, but the nature of OCR requires that the read distance be consistent and that the angle of incidence be minimal (read head close to perpendicular is preferred with slight adjustments made to reduce reflected light). Since in postal applications, most regions of interest will be on the top surface of the item, the manual operation of a standard handheld device would require potentially awkward repetitive motion of the operator and read problems could occur if the height and angle of incidence are not within the appropriate range for the OCR scanner. A hand held device is convenient for reading a wide variety of item sizes and shapes, but the acceptable read rate is reliant on the accuracy of positioning of the device by the operator. The present invention relates to an OCR device that can overcome these problems while retaining most of the flexibility of a hand held scanner.

SUMMARY OF INVENTION

A targeting device of the invention suitable for mounting an optical scanner thereon for scanning a surface of an object includes a frame, a linkage slidably mounted on the frame, an actuator arm secured to the linkage, which actuator arm has an outer surface configured to slidingly engage the surface of the object to be scanned and move in tandem with the linkage along the frame when the object to be scanned is inserted between the actuator arm and a support surface below the actuator arm, and a holder mounted on the linkage configured to mount the optical scanner thereon at a predetermined scanning distance from the object to be scanned engaged by the actuator arm. The scanning device may be an optical character reader or another type of scanner, such as a bar code scanner. Such a targeting device according to the invention minimizes operator repetitive motion, allows for increased throughput of reads, and sets optimal read height for scanning mail pieces for OCR applications. This device will allow the operator to quickly scan packages, letters and flat mail by either sliding the piece across a small platform or setting the piece on a platform with a manual or automatic positioning of the read head above the package.

In an alternate embodiment, a targeting device suitable for mounting an optical scanner thereon for scanning a surface of an object includes a frame, a linkage slidably mounted on the frame and a holder mounted on the linkage configured to mount the optical scanner thereon. A stop member coupled to the linkage extends downwardly to stop downward vertical movement of the linkage such that the optical scanner is positioned at a predetermined scanning distance from an object to be scanned. The targeting device may include a switch mounted on a distal end of the stop member for activating the scanner when the scanner contacts the surface of the object to be scanned.

DETAILED DESCRIPTION

The device of the invention will allow for high volume manual processing of OCR read labels on postal packages, letters, flats and similar objects while optimizing the read depth and targeting the read area for the operator. The operator will manually move the mail piece into position, while the fixture will indicate the location of the read area of the scan head with light emitting diodes that indicate the perimeter. This device can be employed in at least two embodiments, with the preferred embodiment being dependent on the application.

Figure 1:
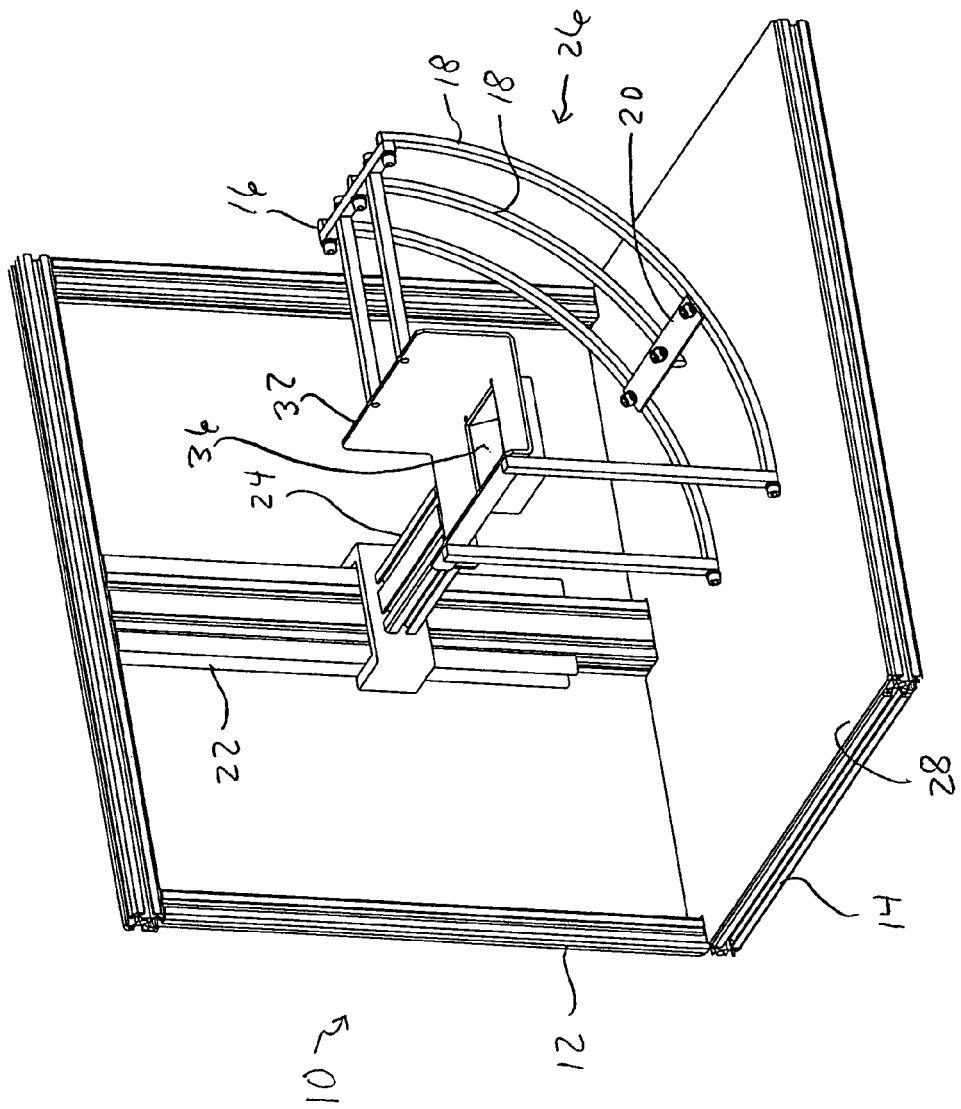
FIG. 1 is a partial perspective view of a targeting device according to a first embodiment of the invention.
Figure 2:
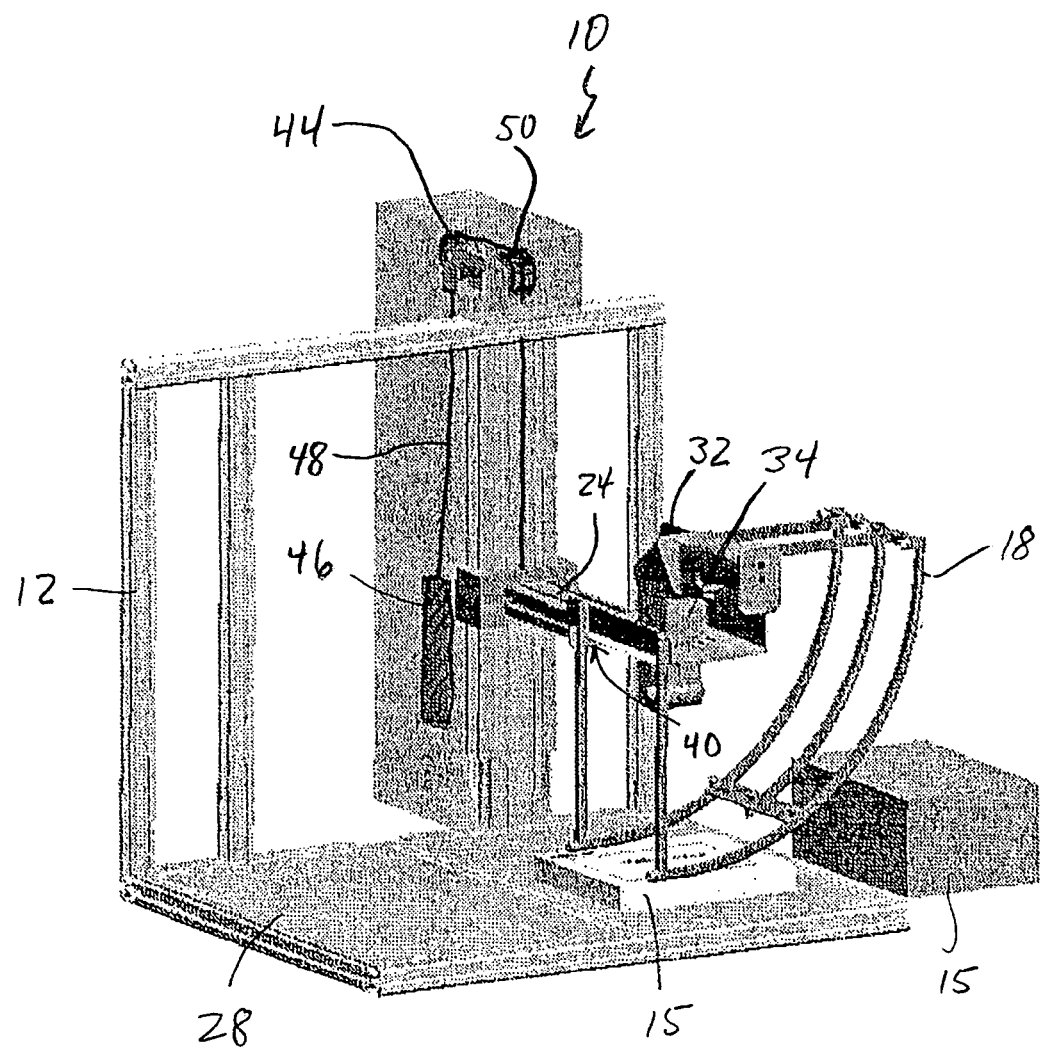
FIG. 2 is a perspective view of the targeting device of FIG. 1 with light emitting diodes, a counterbalancing system and a scanner shown.

Referring to FIGS. 1 and 2, an OCR targeting device 10 according to the invention includes an upright frame 12 mounted on a horizontal base 14 and an actuator arm 16. Actuator arm 16 comprises two or more parallel, spaced, upwardly curving rails 18 united by crossbars 20. Arm 16 is rigidly secured to a linkage 24 that is slidably mounted on a vertical post 22 of frame 12, allowing the arm to be moved vertically. Rails 18 define a curved outer surface 26 configured to slidingly engage the surface of an object such as mail piece 15 to be scanned such that arm 16 moves vertically in tandem with linkage 24 along frame 12 when mail piece 15 is inserted between actuator arm 16 and a support surface 28 below the actuator arm.

A holder or bracket 32 mounted on linkage 24 is configured to hold an optical character scanner 34 at a predetermined scanning distance above mail piece 15 when the mail piece is engaged beneath actuator arm 16. As best illustrated in FIG. 2, a hand held optical character scanner 34 is mounted in targeting device 10 by inserting the scanner into hole 36 in bracket 32. The distance between the lower portion of rails 18 and bracket 32 is such that when optical character scanner 34 is thus positioned, the scanner is held a predetermined distance above a mail piece 15 corresponding to the focus range of optical scanner 34 for rapid and accurate imaging of mail pieces 15 engaged beneath actuator arm 16.

Figure 3:
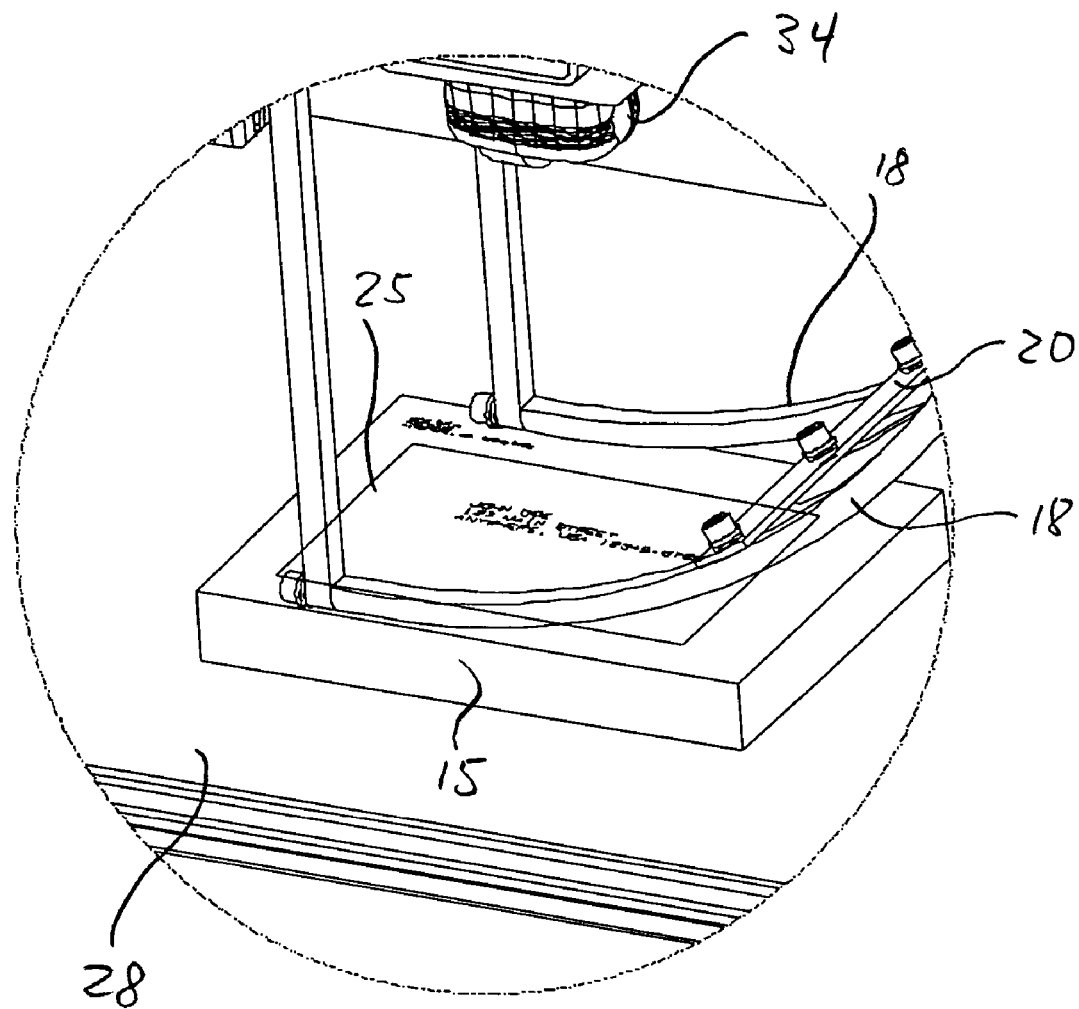
FIG. 3 is a partial perspective view of a mail piece positioned for scanning in targeting device of FIG. 1.

Referring to FIGS. 2 and 3, in order to enable an operator to rapidly position a mail piece 15 to be scanned, one or more light sources may used to target the region of interest to be scanned on the mail piece. In the illustrated embodiment, a plurality of light emitting diodes 40 are mounted on linkage 16 and/or bracket 32 and oriented so as to illuminate or outline an area 25 between rails 18 corresponding to the area imaged by scanner 34 when positioned in actuator arm 16. Thus, the operator slides mail piece 15 across support surface 28 under rails 18 until the region of interest is outlined or highlighted by light emitting diodes 40. In order to facilitate placement of mail piece 15 for imaging, rails 18 of actuator arm 16 are spaced apart such that an operator may easily view mail piece 15 as he or she slides the mail piece under rails 18 with the region of interest positioned between the rails. When the operator has thus positioned mail piece 15 he or she actuates a pushbutton, foot switch or other switching device to activate optical character scanner 34 to capture an image of the surface of mail piece 15.

After optical scanner 34 has captured an image of mail piece 15, the operator continues to slide the mail piece across support surface 28 and out from beneath actuator arm 16. As mail piece 15 is removed from under actuator arm 16, the actuator arm linkage 24 is lowered to an initial position with a counterbalance mechanism 44. As best illustrated in FIG. 2, counter balance mechanism 44 comprises a counterweight 46 that is coupled to linkage 24 with a cable 48 that passes over one or more pulleys 50. In one embodiment, counterweight 46 is selected such that linkage 24 and arm 16 are biased toward an initial position as shown in FIG. 1 wherein the lower ends of rails 18 contact support surface 28. Counter balance mechanism 44 also reduces the amount of force required to lift actuator arm 16 and linkage 24 thereby aiding the operator to easily position actuator arm 16. For example, the operator may wish to hold actuator arm 16 in an elevated position between mail pieces, allowing the arm to drop to the surface of a smaller mail piece or raising the arm for taller mail pieces.

Figure 4:
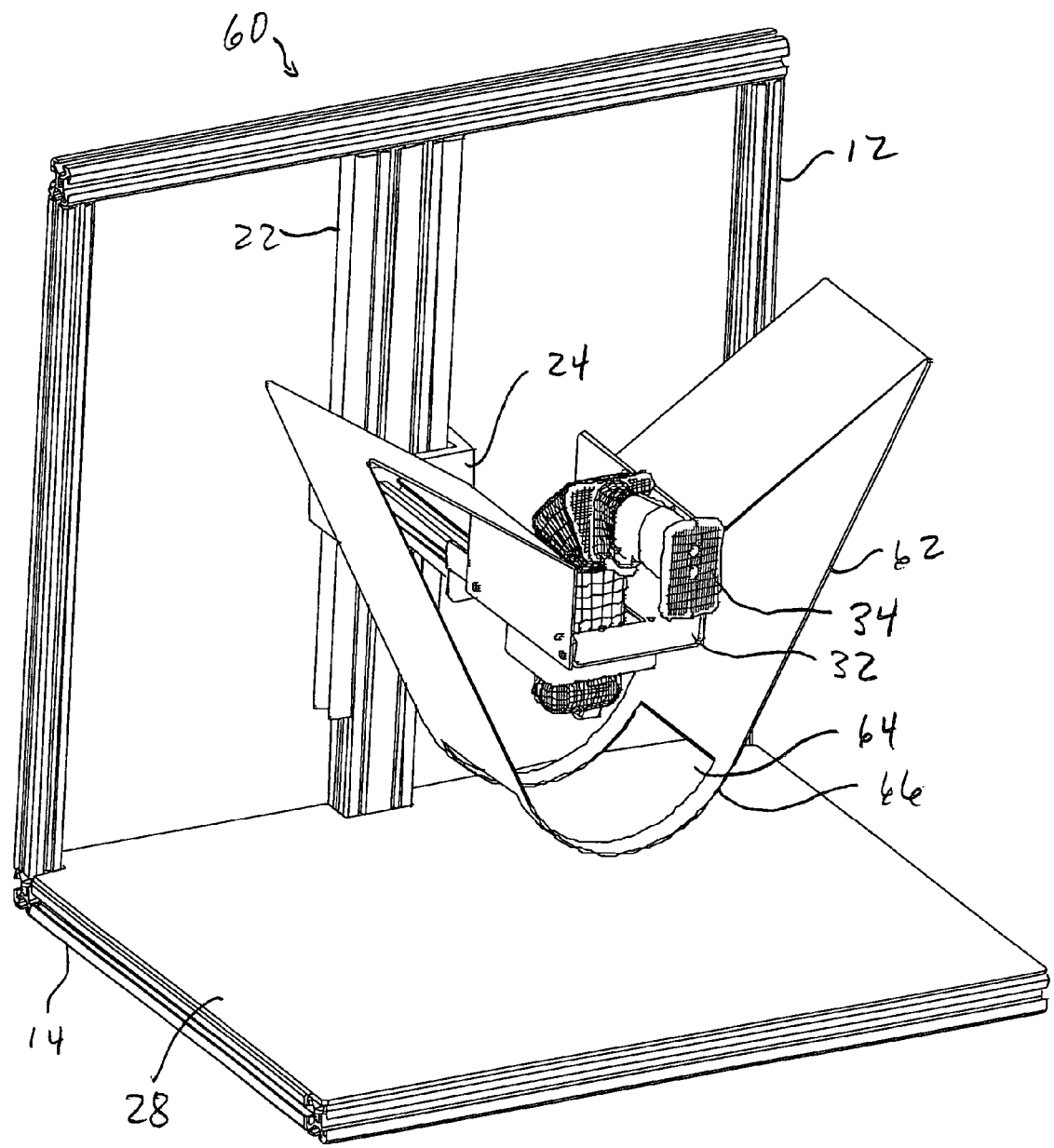
FIG. 4 is a perspective view of a first alternate embodiment of the invention.

Referring now to FIG. 4, in an alternate embodiment, a targeting device 60 is substantially identical to device 10 except that curved rails 18 of FIG. 1 are replaced with a curved plate 62. As illustrated, curved plate 62 is formed with a centrally located hole 64 through which optical scanner 34 may image an object placed on support surface 28. Curved plate 62 is configured such that the distance between the lowermost surface of curved plate 62 and optical scanner 34 is within the focus range of the scanner. As in the case of rails 18 of FIG. 1, curved plate 62 defines a curved outer surface 66 configured to slidingly engage the surface of an object to be scanned and move in tandem with linkage 24 along frame 12 when the object to be scanned is inserted between plate 62 and support surface 28 such that scanner 34 is positioned a predetermined scanning distance from the object.

Figure 5:
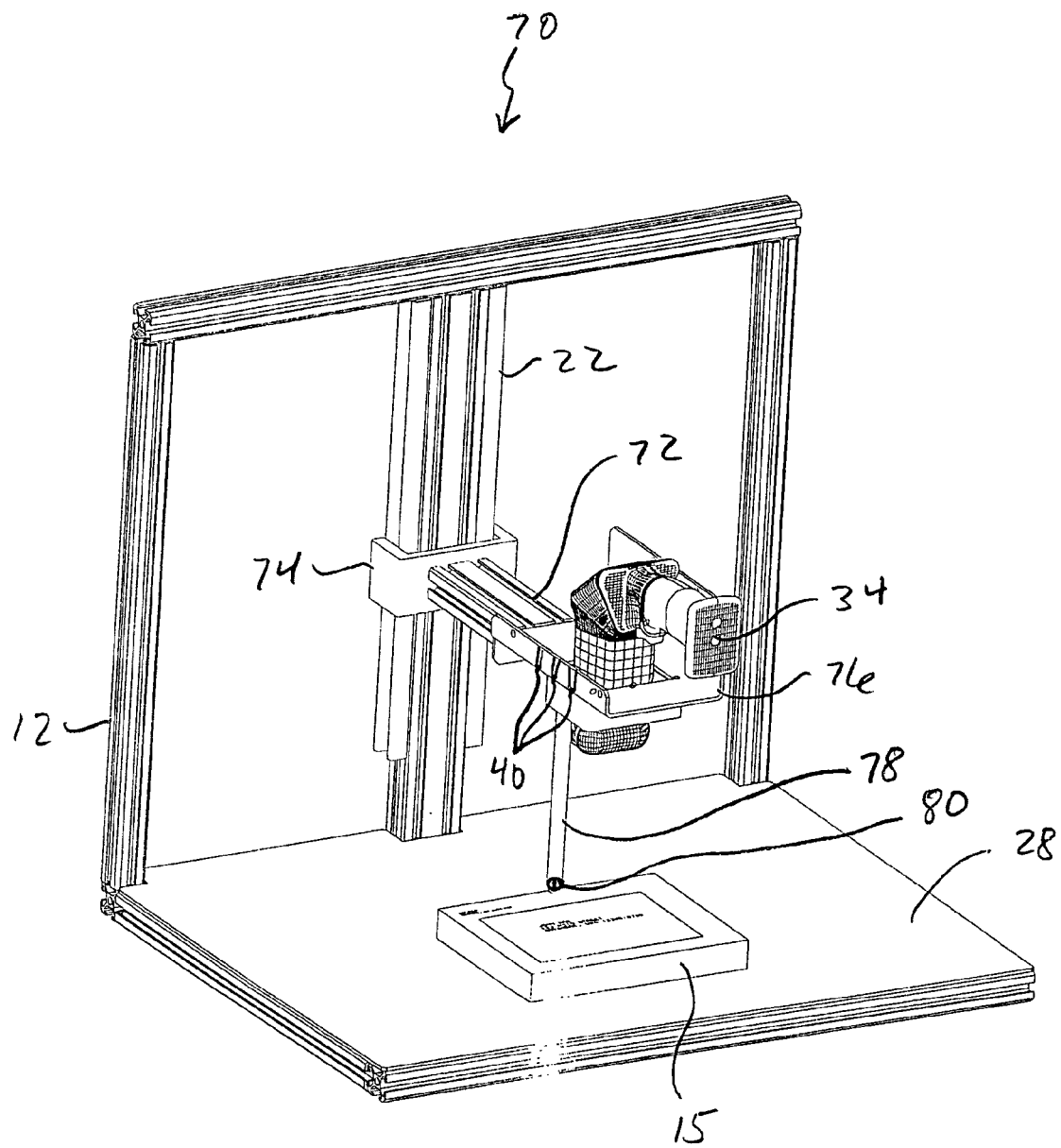
FIG. 5 is a perspective view of a second embodiment of the invention.

Referring to FIG. 5 in another embodiment, a targeting device 70 according to the invention may be preferred when the mail pieces vary greatly in height. Device 70 employs a linkage 72 including a frictionally dampened linear track motion system 74 that the operator positions after placing the region of interest of mail piece 15 within the read area boundary indicated by the targeting light emitting diodes 40. A bracket 76 mounted on linkage 72 is configured to hold optical scanner 34 and includes a stop member 78 extending vertically beneath the bracket. The length of stop member 78 is selected such that length between the distal end of member 78 and optical scanner 34 is within the focus range of the scanner. A switch 80 is mounted on the distal end of member 78 activates optical scanner 34. Thus, after the operator has positioned mail piece 15 on support surface 28, he or she lowers linkage 72 until switch 80 contacts mail piece 15 at which time scanner 34 is activated to capture an image of the mail piece.

Since linear track system 74 is dampened for the mass of scanner 34 and linkage 72, the operator can lower or raise linkage 72 as needed with minimal effort, and the scanner will stay in position until moved. This embodiment may be preferred when processing in batches of similar height such as letter mail or flats.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, the frame could be mounted in a cantilevered position from a vertical wall, and an adjoining surface (such as the top of a table) could be used for positioning mail pieces for scanning, eliminating need for a horizontal base. It will also be appreciated that a such a device could receive and scan a series of mail pieces of varying sizes from an automated feeder that advances them one at a time, in either a horizontal or vertical position. The frame of the scanner fixture could also include provision for mounting a bar code printing device that will allow the operator to attach a bar code label to each processed mail piece once the OCR read has produced an address or other information of interest (if used in applications other than postal type operations). All such variations and additions are specifically contemplated to be with the scope of the invention. It is, therefore, intended that the appended claims encompass any such modifications or embodiments.

The invention claimed is:

1. A targeting device suitable for mounting an optical scanner thereon for scanning a surface of an object, comprising:
   a frame;
   a linkage slidably mounted on the frame;
   an actuator arm secured to the linkage, which actuator arm has a curved outer surface configured to slidingly engage the surface of the object to be scanned and move in tandem with the linkage along the frame when the object to be scanned is inserted between the actuator arm and a support surface below the actuator arm; and
   a holder mounted on the linkage configured to mount the optical scanner thereon at a predetermined scanning distance from the object to be scanned engaged by the actuator arm.

2. The device of claim 1, wherein the optical scanner is an optical character reader.

3. The device of claim 1, wherein the object is a mail piece, and the holder is mounted at a position appropriate for recording region of interest address information from the mail piece.

4. The device of claim 1, further comprising a base disposable horizontally on which the frame is rigidly mounted in an upright position, with a distal end of the actuator arm in engagement with the base, an upper surface of the base comprising the support surface.

5. The device of claim 1, further comprising means for biasing the linkage, holder and actuator arm to a position at which a distal end of the actuator arm engages the support surface.

6. The device of claim 3, wherein the actuator arm comprises a pair of curved rails that slidingly engages the surface of the mail piece to be scanned on opposite sides of the region of interest.

7. The device of claim 3, wherein the actuator arm comprises a curved plate that slidingly engages the surface of the mail piece to be scanned, the curved plate including a centrally located hole configured to expose the region of interest for scanning.

8. A targeting device suitable for mounting an optical scanner thereon for scanning a surface of an object, comprising:
   a frame including a base and an upright post extending from the base;
   a linkage slidably mounted on the post;
   an actuator arm secured to and extending from the linkage, which actuator arm has a curved undersurface configured to slidingly engage the surface of the object to be scanned and move in tandem with the linkage along the post when the object to be scanned is inserted between the actuator arm and a support undersurface below the actuator arm; and holder supported by the actuator arm and configured to mount the optical scanner thereon at a predetermined scanning distance from the object to be scanned.

9. The device of claim 8, wherein the holder is mounted on the linkage for movement therewith.

10. The device of claim 8, wherein the curved undersurface has an opening therein through which an optical scanner mounted on the holder can view an upper surface of the object.

11. The device of claim 8, wherein the support surface is an upper surface of the base at a location spaced from the post.

12. The device of claim 8, wherein curved undersurface of the actuator arm comprises a pair of curved rails that slidingly engage the surface of the object to be scanned on opposite sides of a region of interest.

13. The device of claim 8, wherein the object is a flat mail piece, and the curved undersurface is configured for engaging an outer surface of the mail piece.

14. The device of claim 8, wherein the actuator arm comprises a curved plate that slidingly engages the surface of the mail piece to be scanned, the curved plate including a centrally located hole configured to expose the region of interest for scanning.

15. The device of claim 8, wherein the optical scanner is an optical character reader mounted on the holder.

16. A method of reading indicia from a flat outer surface of a object with a scanner, comprising:

positioning the object beneath a targeting device suitable mounting an optical scanner thereon, which device includes a frame including a base and an upright post extending from the base, a linkage slidably mounted on the post, an actuator arm secured to and extending from the linkage, which actuator arm has a curved undersurface which lidingly engages the surface of the object to be scanned and moves in tandem with the linkage along the post when the object to be scanned is inserted between the actuator arm and a support surface below the actuator arm, and a holder configured to mount the optical scanner thereon at a predetermined scanning distance from the object to be scanned;

sliding the object between the support surface and the curved undersurface to a position readable by the optical scanner, causing the actuator arm and linkage to rise on the post; and activating the scanner to capture an image of the surface of the object.

17. The method of claim 16, wherein the object comprises a flat mail piece.

* * * * *